March 25, 1958 W. C. LANNING 2,828,477

SHIFTING REGISTER

Filed Dec. 13, 1955 2 Sheets-Sheet 1

INVENTOR
WALTER C. LANNING
BY R. J. Craddock
ATTORNEY

INVENTOR
WALTER C. LANNING
BY
R. J. Craddock
ATTORNEY

United States Patent Office 2,828,477

Patented Mar. 25, 1958

2,828,477

SHIFTING REGISTER

Walter C. Lanning, Plainview, N. Y., assignor to Sperry Rand Corporation, a corporation of Delaware Application December 13, 1955, Serial No. 552,763

7 Claims. (Cl. 340—174)

The invention relates to electrical storage circuits and more particularly to electrical storage circuits for use in computer shifting registers.

In digital computing systems it is frequently necessary to store electrical signals representing numbers at the time they are generated and to deliver these stored numbers at a subsequent time for further use in the computer. A device for storing a digital number and delivering the stored information in response to a command signal is known as a register. A register usually employs one storage element for each digit in the number.

In a binary digital computing system a number may be represented by a train of electrical signal elements uniformly spaced in time wherein the presence of a pulse designates the number 1 and the absence of a pulse designates the number 0. When the numbers are thus represented while being processed in a computer the operation of the computer is known as serial operation. In the serial mode of operation only one channel or wire is used for a number and the digits are transmitted one at a time "serially" on this channel.

In a register of a serially operated computer the individual elements for storing each digit are connected in tandem. As the digits of a number are being stored they are transferred from one storage element to another away from the input terminal until each of the storage elements in the register is occupied by one digit of the number, the storage element nearest the input terminal storing the last digit to enter the register. In delivering the stored number the register transfers each digit from one storage element to another toward the output terminal until all the stored digits have been delivered to the output terminal. Such a register is termed a "shifting register." In such a register it is often desirable to retain the stored number within the register while simultaneously delivering information at the output terminal representative of the stored number. This may be accomplished by connecting the output terminal back to the input terminal while the stored number is being shifted from storage element to storage element toward the output terminal.

It is therefore an object of this invention to provide a computer shifting register.

It is a further object of this invention to provide a shifting register for a binary digital computer.

It is a further object of this invention to provide a binary digital shifting register element.

It is a further object of this invention to provide a binary digital shifting register element employing magnetic core logic elements.

In accordance with the present invention each digit of a binary digital number is stored in a storage element employing magnetic core logical elements. The stored digit is circulated about a loop comprising a pair of these logical elements, each capable of receiving two input signals representing respective binary digits at a pair of input terminals and after a predetermined delay delivering at first and second output terminals signals representing respectively 1 and 0 when both of the input signals represent 1's and signals representing respectively 0 and 1 when any one of the input signals represents 0. Each of the second output terminals of these logical elements is connected by a lead to one input terminal of the other logical element of the pair. A stored digit which circulates about the resulting loop will be alternately 1 and 0 in each of these leads. The other output terminal of one of the logical elements is connected to one input terminal of a third similar logical element, its other input terminal being connected to a command unit. The command unit delivers a binary digital signal representing 1 when it is desired to read the stored digit out of the storage element. Simultaneously the command unit will deliver a signal to clear the loop circuit; that is, to store a 0 in the circuit.

Other objects and advantages of the present invention will become apparent from the specification taken in connection with the accompanying drawings, wherein.

In the following description and claims certain of the mathematical operations which are peculiarly applicable to binary digital computation may be defined as follows: And—yields a 1 out if both inputs are 1.

| | | B 0 | B 1 |
|---|---|---|---|
| A | 0 | 0 | 0 |
| A | 1 | 0 | 1 |

This operation is performed by an And logical element. Or—yields a 1 out if either or both of the inputs are 1.

| | | B 0 | B 1 |
|---|---|---|---|
| A | 0 | 0 | 1 |
| A | 1 | 1 | 1 |

This operation is performed by an Or logical element. Not—yields the opposite digit or number of the digit input. Whereas the aforementioned logical elements perform a mathematical operation in combining two binary digital numbers, the Not logical element operates on a single binary digital number. Thus if the input to a Not logical element is 1, the output is 0 and vice versa.

Figure 1:
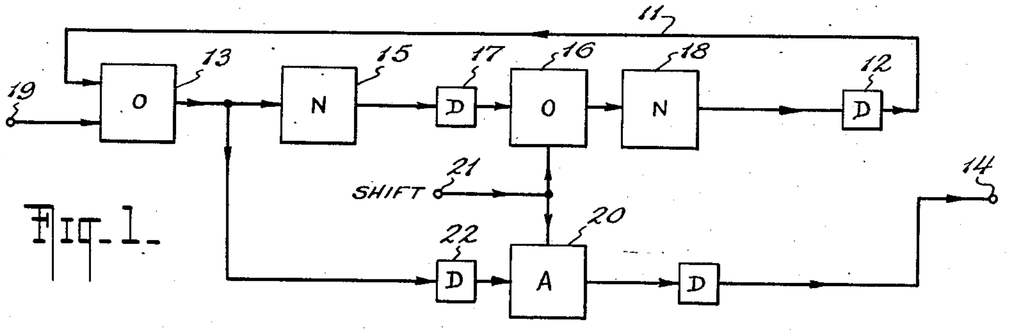
Fig. 1 is a block diagram useful in explaining the theory of operation of this invention.

Referring now to Fig. 1, there is shown in block diagram form the system of binary logic employed by the shifting register element of this invention. In this figure the blocks with the letter A are And logical elements, the blocks with the letter O are Or logical elements, and the blocks with the letter N are Not logical elements. The blocks with the letter D are elements which present delays to the signals passing therethrough. These logical function elements are shown interconnected by lines which represent the direction and order of transference of numbers through the register element. To facilitate the description of the operation of this register element, the digit which circulates in the lead 11, which connects the delay element 12 to the Or logical element 13, will be considered the digit stored, because it is this digit which is delivered at output terminal 14 when shift command signals are applied to the register element.

Assume now that a 1 is stored in the register element. The output of delay element 12 will be a signal representing 1, which will flow through lead 11 to Or logical element 13. The output of Or logical element 13 will thus be a 1, which will be delivered to Not logical element 15. Since the output of a Not logical element is the opposite digit from its digit input, the output of Not logical element 15 will be a 0, which is delivered to the Or logical element 16 through the delay element 17. The output of Or logical element 16 will be a 0, which is delivered to Not logical element 18. The output of Not logical element 18 will be a 1, which is then applied to delay element 12 thereby completing the travel of the digit around the loop. Thus a signal element travels about the loop described, alternately becoming a 0 and a 1.

In a shifting register, a plurality of the elements of Fig. 1 are connected in tandem by connecting the output terminal 14 of one register element to the input terminal 19 of the next succeeding register element. An And logical element 20 is the gating means by which the stored signal is shifted from one element to the next element in the chain. The signal element circulating in the loop is also delivered from Or logical element 13 through a delay element 22 to an input terminal of And logical element 20. The shift terminal 21 is connected directly to another input terminal of And logical element 20. In the absence of a shift command signal, represented by a digit 1 applied to shift terminal 21, one input to And logical element 20 will be a 0, and the output of logical element 20 will always be a 0. When a 1 is stored in the register element it will be delivered from Or logical 13 through delay element 22 to And logical element 20. If, now, coincidentally with the arrival of this signal at And logical element 20, a shift command signal is applied at shift terminal 21, a 1 will be delivered for application to the next succeeding register element.

Simultaneously with the delivery of the shift command signal to And logical element 20, the command signal will be applied to Or logical element 16 in order to clear the register element; that is, to change the signal stored in the circuit to a 0. This prepares the circuit for the receipt of a digit from the next preceding register element. When the shift command signal, representing a digit 1, is applied to Or logical element 16, it causes a 1 to be delivered to the Not logical element 18, whose output is then a 0, which is circulated in lead 11. When a 0 is circulating in the loop the register element is prepared to respond to an input digit applied to input terminal 19. Thereupon the delivery of a digit 0 or 1 to terminal 19 will store respectively a 0 or 1 in the register element.

In the event a 0 is circulating in the circuit the application of a shift command signal to terminal 21 will not change the operation of the circuit. Since one of the signals delivered to And logical element 20 is a 0 its output will be a 0. The application of the shift command signal to the Or logical element 16 will not change the stored digit since a 1 was circulating from Not logical element 15 to Not logical element 18.

Thus, the application of the shift command signal to this register element delivers the stored signal at the output terminal 14 and clears the register element.

Figures 2, 3, 4:
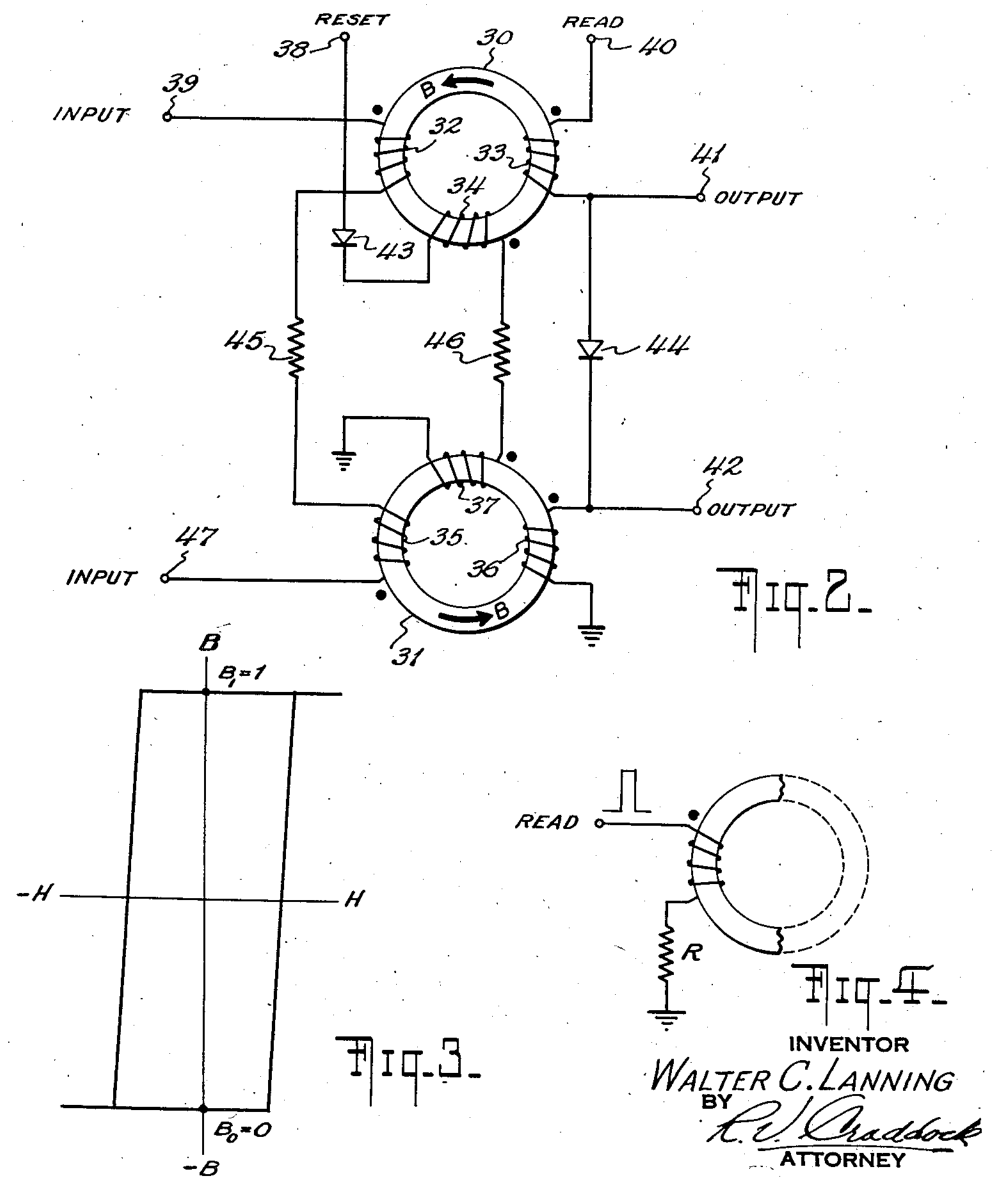
Fig. 2 is a schematic diagram of a circuit element suitable for use in this invention.
Fig. 3 is a graph illustrating the hysteresis loop of the magnetic material used in the element of Fig. 2.
Fig. 4 is a circuit used to illustrate the operation of the element of Fig. 2.

A particular circuit element which is suitable for use in a binary digital computing circuit and which facilitates assemblage of the instant register circuit according to the principles described, is shown in Fig. 2. For purposes of simplicity, this circuit element will henceforth be termed a functor. The functor comprises a pair of toroidal magnetic cores 30 and 31, on each core there being wound an input, an output, and a reset winding. Input winding 32, output winding 33, and reset winding 34 are wound on core 30. Input winding 35, output winding 36, and reset winding 37 are wound on core 31. The magnetization effect of each winding on its core is indicated by the presence of a dot near one end or terminal of the winding. Positive current entering the dotted terminal of any winding tends to set up magnetic flux in the core in the arbitrarily assigned positive direction, as shown by the arrows.

An idealized hysteresis loop of the cores of the functor is shown in Fig. 3. These cores have the property of low coercive force and high residual magnetism. A core may be readily magnetized with a given direction of residual magnetic field or into a given remanence state by applying sufficient current of proper polarity to any of its windings to drive the core to saturation. A core is magnetized into the defined unity remanence state by applying positive saturating current to the dotted terminal of any of its windings. Similarly, a core is magnetized into the zero remanence state by applying positive saturating current to the undotted terminal of any of its windings. Thus, if a core is in the zero state, a large positive pulse of current entering the dotted terminal of any one of its windings is sufficient to change the remanence state from zero to unity. On the other hand, with the core in the zero state, if the positive pulse of current enters the winding at the undotted terminal, no change of remanence state occurs and the core will remain magnetized in the zero state.

To illustrate how pulses are read out of the functor, the exemplary circuit of Fig. 4 is used. In this circuit, a coil wound on a magnetic core, such as is used in the functor, is shown in series with a resistance. If the core is in the zero remanence state, a positive pulse of current applied to the read terminal enters the winding at its dotted end and passes through the resistor to ground. The pulse of current tends to change the state of the core from zero to one and the residual magnetism from $B_0$ to $B_1$. This attempted change of flux through its turns will induce a voltage in the winding, causing it to act as a high impedance. Thus, most of the voltage applied to the read terminal will appear across the winding and but a very small portion across the resistor. If the core is magnetized in the unity remanence state, a positive pulse of current applied to the dotted terminal of the coil tends to cause no change of remanence state. Consequently, there will be but little voltage induced in the winding, and it acts as a low impedance, so that most of the voltage applied to the read terminal will appear across the resistor.

The appearance of a pulse across the resistor of Fig. 4 occurs when the core is in the unity state. Hence, the output pulse on the resistor when the core is in the unity state may be considered to be an output of unity. The absence of an output pulse when the core is in the zero state may be considered to be an output of zero. Therefore, in this functor and in its associated circuitry, the presence of a pulse indicates the presence of the digit 1 and the absence of a pulse the presence of the digit 0.

The windings of the functor are energized by positive pulses from a clock source. The clock source delivers periodic trains of pulses at a plurality of terminals. While the periods of all pulse trains are alike, the pulses in different trains are displaced in time. The functor reset terminal 38 and read terminal 40 are connected directly to different terminals of the clock source. The input terminal 39 is connected to another terminal of the clock source either directly or through intermediate circuitry which may or may not permit passage of the particular clock pulse to the input terminal 39. It is necessary that the terminals of the clock source be so selected that the cyclical order of pulses energizing the functor windings follow the pattern of reset, input, and read.

The clock pulses applied to reset terminal 38 enter reset winding 34 at its undotted end and reset winding 37 at its dotted end, thereby setting core 30 to 0 and core 31 to 1. A positive pulse applied to input terminal 39 enters input winding 32 at its dotted end and input winding 35 at its undotted end. If no input pulse reaches input terminal 39 during a particular clock cycle, the cores remain in their reset state. However, if a pulse enters input terminal 39, core 30 is set to 1 and core 31 is set to 0.

A pulse applied to the read terminal 40 enters winding 33 at its dotted end. Output terminal 41 acts only as a current source. If core 30 is set to 0, the output winding 33 acts as a high impedance and little current can flow from output terminal 41. Thus, the output signal from output terminal 41, will be a 0 in accordance with the principles explained in connection with Fig. 4. If core 30 is set to 1, the output winding 33 acts as a low impedance and an output pulse, representing the number 1, will appear at output terminal 41.

Output terminal 42, which acts only as a current sink, is connected through intermediate circuitry to the same terminal of the clock source as read terminal 40. With core 31 set to 0, output winding 36 acts as a high impedance and prevents current flow in the intermediate circuitry. Thus, the signal from the terminal 42 may be said to be a 0. If core 31 is set to 1, output winding 36 acts as a low impedance and permits current to flow in the intermediate circuit connected to terminal 42. Thus, the signal from terminal 42 may be said to be a 1.

Summarizing the above analysis, if the input signal to the functor is 1, the output signal of terminal 41 is 1, and the output signal of terminal 42 is 0. On the other hand, if the input signal is 0, the output signal from terminal 41 is 0, and the output signal from terminal 42 is 1. The electrical significance of such a result is that with an input of 1, the functor will deliver a pulse at one output terminal, but will not allow reception of a pulse at the other output terminal. If the input is 0, the functor will deliver no pulse at one output terminal, but will allow reception of a pulse at the other output terminal. A functor which operates in this manner is designated a functor zero.

If the output windings of the two cores are each wound in the opposite direction from that of Fig. 2, the functor will perform in an opposite manner. In this case, an input 1 will yield an output of 0 at terminal 41 and an output of 1 at terminal 42. Again expressing its operation electrically, if the input is 1, the functor will not deliver an output pulse at one output terminal, but will allow reception of a pulse at the other output terminal. Such a functor is designated as a functor one.

In its use in a computing circuit a functor is interconnected with other functors. Thus, in the functor of Fig. 2, the input terminal 39 is connected to a current source output terminal of a preceding functor. The input terminal 47 is connected to a current sink output terminal of a preceding functor. Similarly, output terminals 41 and 42 are connected to input terminals of succeeding functors. Thus, input windings 32 and 35 are in series with each other and in series with a preceding current source output terminal and a preceding current sink output terminal. Only if both the preceding current source and the preceding current sink generate an output signal of 1 does a current pulse flow in the input windings 32 and 35. If either or both of the preceding functors generates an output signal of 0, a 0 signal will be applied to the input windings 32 and 35. Thus, the functor zero if Fig. 2 yields a 1 at its current source terminal output 41 only if both inputs are 1, and therefore, acts basically as an And logical element. The functor one yields a 1 at its current source output terminal if the input is 0—1 and yields a 0 at the same terminal if the input is 1—1. In this use the functor acts as a Not logical element.

Figures 5, 6:
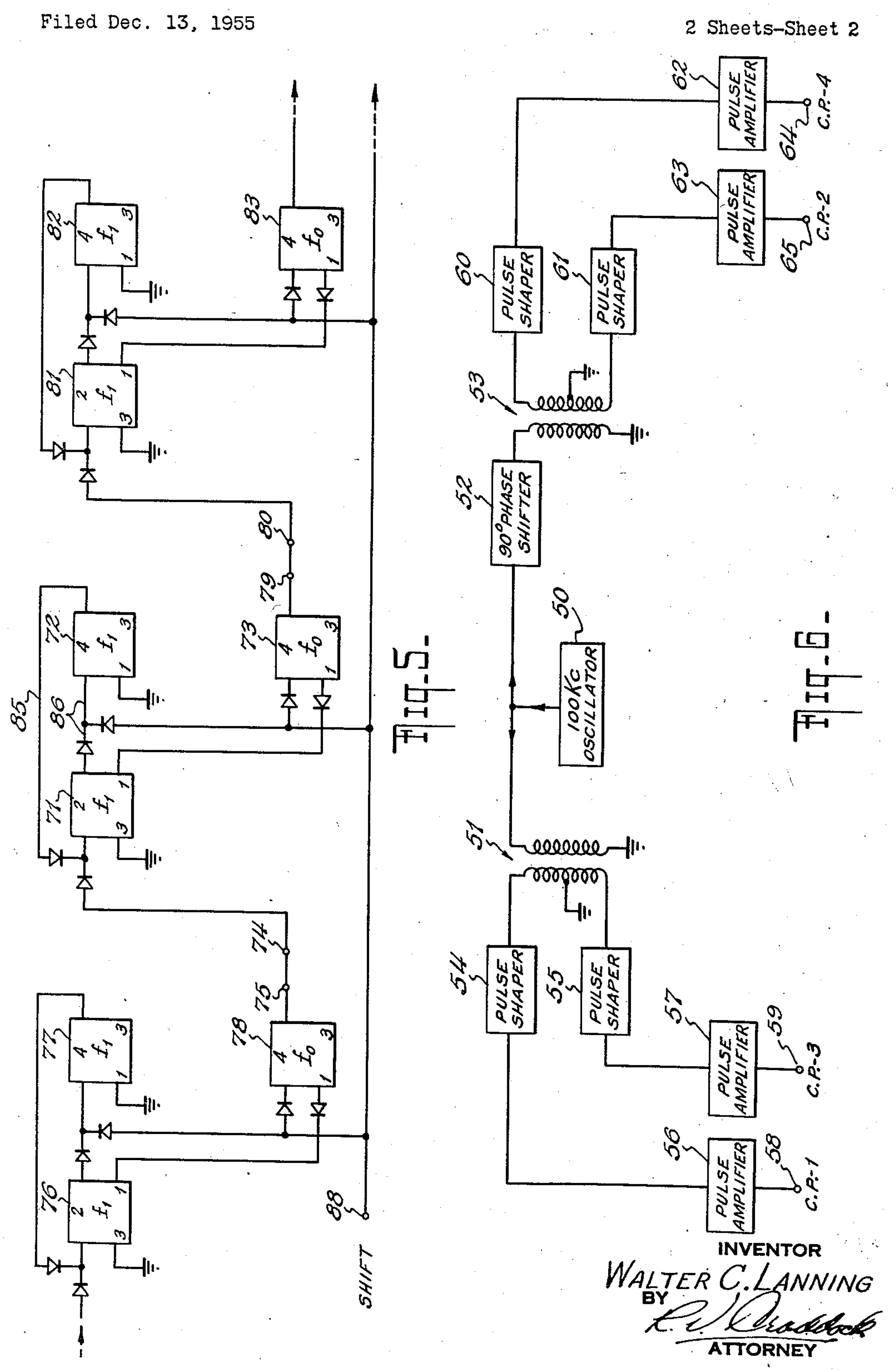
Fig. 5 is a circuit diagram of the preferred shifting register of this invention.
Fig. 6 is a circuit diagram of a clock source to be used in conjunction with the circuit of Fig. 5.

The computer shifting register circuit of this invention, as shown in detail in Fig. 5, is constructed by proper interconnection of a plurality of functor elements of the type described. In this figure the functor elements are shown as blocks having four terminals, the two terminals on the left of each block representing the input terminals and the two terminals on the right representing the output terminals. The upper output terminal is the current source terminal and the lower output terminal is the current sink terminal. This register circuit is capable of storing either one of the binary digits 0 and 1, the number 1 being represented by an electrical pulse and the number 0 by the absence of a pulse, and of delivering at an output terminal the stored digit in response to a command signal.

A clock source for delivering positive pulses to the reset, input, and output windings is shown in Fig. 6. The clock source delivers four clock pulses spaced 90° apart during one clock cycle, the clock cycles recurring at 100 kc. A 100 kc. oscillator 50 determines the recurrence frequency of the clock pulses. The output signal of oscillator 50 is split into two portions, one portion being applied to the primary winding of a transformer 51 and the other portion, after being delayed by 90° in phase shifter 52, being applied to the primary winding of a transformer 53. The secondary winding of transformer 51 is center tapped in order to provide two signals, one from each end of the secondary winding, 180° out of phase with each other. The two signals from the secondary winding of transformer 51 are passed through respective pulse shaper networks 54 and 55 and respective pulse amplifiers 56 and 57 to clock pulse terminals 58 and 59. The secondary winding of transformer 53 is center tapped in order to provide two signals, one from each end of the secondary winding, 180° out of phase with each other, and also 90° out of phase with respect to corresponding signals delivered by the secondary winding of transformer 51. The two signals from the secondary winding of transformer 53 are passed through respective pulse shaper networks 60 and 61 and respective amplifiers 62 and 63 to clock pulse terminals 64 and 65. Thus, the output of the clock source is a series of recurring positive pulses from each of four output terminals. The pulse recurrence frequency of the signal from each terminal is 100 kc. One pulse is delivered from each of the terminals during each cycle of oscillator 50. The clock pulses are delivered in cyclical order from terminals 58, 65, 59 and 64. Terminals 58, 65, 59, and 64 are respectively labeled CP–1, CP–2, CP–3, and CP–4 to indicate the cyclical order of the clock pulse available at that terminal.

Referring again to Fig. 5, in the block representing each functor is a series of numerals representing clock pulse numbers. The numeral in the lower left corner indicates the number of the clock pulse which energizes the input windings of the functor. The numeral in the lower right corner indicates the number of the clock pulse which energizes the output windings of the functor. The numeral in the top center portion of the block indicates the number of the clock pulse which resets the functors. Fig. 5 discloses three shifting register elements connected in tandem. The following description of the operation of this device will discuss the particular register element comprising the functors 71, 72 and 73, the element receiving signals at an input terminal 74 from a preceding register element comprising the functors 76, 77, and 78, and delivering its stored signal at an output terminal 79 to a succeeding register element comprising the functors 81, 82 and 83. The functors 71 and 72 and their interconnecting leads 85 and 86 constitute a loop of the type described in Fig. 1, in which the stored digits circulate. Both functors 71 and 72 are of the functor one type. The current source output terminal of functor 71 is connected by lead 86 to one input terminal of functor 72. The current source output terminal of functor 72 is connected by lead 85 to one input terminal of functor 71. The other input terminals of both functors 71 and 72 are connected to ground. To facilitate the description of the operation of this circuit, the digit circulating in lead 85 will be considered the digit stored in the register element.

Assume now that on clock pulse 1 no pulse is delivered at the current source output terminal of functor 71; that is, the output from this terminal is a 0. This zero is delivered to an input terminal of functor 72. The state of functor 72 will not be changed and on the next clock pulse 3 a 1, represented by a current pulse, will be delivered at the current source output terminal of functor 72. This 1 will pass through lead 85 to an input terminal of functor 71. The other input terminal of functor 71 is connected so as to offer a ready path for the flow of current through the input winding of functor 71. The effect of such a connection is that of a 1 applied at this input terminal. Thus with a 1 applied to both input terminals of functor 71 its output on the next succeeding clock pulse 1 will be a 0. This signal element will continue to circulate about the loop in the manner described until a shift command signal clears the register element.

In a similar manner, if a 0 is stored in the register element, a 0 will circulate in lead 85 and a 1 will circulate in lead 86. This 0 will continue to circulate until a 1 is stored in the register element by a signal from the preceding register element.

Assume now that a shift command signal (a pulse) is applied to terminal 88 on clock pulse 1. This pulse will be delivered to one input terminal of functor 73, a functor zero type, the other input terminal of which is connected to the current sink output terminal of functor 71. If a 1 is stored in the register element the current sink output terminal of functor 71 will offer a low impedance path for the flow of current through the input winding of functor 73. Thus a 1 will be delivered to both input terminals of functor 73, and on the next succeeding clock pulse 3 a 1 will be delivered at the register element output terminal 79 to an input terminal 80 of the next succeeding register element. At the moment an output signal is being delivered from terminal 79 of this register element, it must be prepared to receive an input signal at terminal 74 from the next preceding register element. In order to be prepared to receive an input signal the register element must have a stored 0. By also applying the shift command pulse to the same input terminal of functor 72 to which the output terminal of functor 71 is connected, functor 72 will deliver a 0 at its current source output terminal on the next succeeding clock pulse 3. The circuit will then store either 0 or 1 in accordance with the output signal delivered by the next preceding register element. Therefore, in accordance with the principles thus described the register circuit element of this invention will store a binary digit, and in response to a command deliver this digit at an output terminal while it is simultaneously being cleared.

While the functors used and the interconnections described in circuit of Fig. 5 represents the preferred embodiment of this invention, many modifications may be made in the circuit without departing from the spirit of this invention. Thus, the functors 71 and 72 may be of the functor zero type. In such case the current sink output terminal of each functor would be connected to an input terminal of the other functor of the pair. The other input terminal of each functor would be connected directly to a terminal of the clock source. The shift signal, instead of being a pulse, would be a low impedance path for the flow of current during the interval when the shift command signal is applied.

Functors 71 and 72 may also be unlike, that is, one may be a functor zero and the other a functor one. In such instance the current sink output terminal of the functor zero element would be connected to an input terminal of the functor one element and the current source output terminal of the functor one element would be connected to an input terminal of the functor zero element.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A shifting register circuit element for a binary digital computer comprising first, second and third logical elements each capable of receiving two input signals representing respective binary digits at a pair of input terminals, and after a predetermined delay delivering at first and second output terminals signals representing respectively one and zero when both the input signals represent ones and signals representing respectively zero and one when any one of the input signals represents zero, each of said second output terminals of said first and second logical elements being connected respectively to one input terminal of said second and first logical elements, each of the other input terminals of said first and second logical elements being connected to a source of signals representing continuous ones, said first output terminal of said first logical element being connected to one input terminal of said third logical element, and a temporally controllable source of signals representing one, said controllable source being coupled to said one input terminal of said second logical element and to the other input terminal of said third logical element, whereby the signals of said controllable source may be delivered to the circuit simultaneously with the delivery of output signals by said first logical element.

2. A shifting register circuit element for a binary digital computer comprising first, second and third logical elements each capable of receiving two input signals representing respective binary digits at a pair of input terminals, and after a predetermined delay delivering at first and second output terminals signals representing respectively one and zero when both of the input signals represent ones, and signals representing respectively zero and one when any one of the input signals represents zero, each of said second output terminals of said first and second logical elements being connected respectively to one input terminal of said second and first logical elements, said first output terminal of said first logical element being connected to one input terminal of said third logical element, and a temporally controllable source of signals representing one, said source being coupled to said one input terminal of said second logical element and to the other input terminal of said third logical element, whereby the signals of said source may be delivered to the circuit simultaneously with the delivery of output signals by said first logical element.

3. A shifting register element for a binary digital computer comprising a first Or logical element having at least two input terminals, a first Not logical element, a first delay means, a second Or logical element, a second Not logical element, and a second delay means connected in tandem, an output terminal of said second delay means being connected to an input terminal of said first Or logical element, the other input terminal of said first Or logical element being connected to an output terminal of a preceding shifting register element, whereby a binary signal may be dynamically stored in response to an input signal from said preceding shifting register element, a third delay means, an And logical element, an output terminal of said third delay means being connected to an input terminal of said And logical element, a portion of the output signal of said first Or logical element being coupled to said third delay means, a source of shifting command signals, said source being coupled to another input terminal of said second Or logical element and another input terminal of said And logical element, and a fourth delay means, the output signal of said And logical element being coupled to said fourth delay means, an output terminal of said fourth delay means being connected to an input terminal of a succeeding shifting register element, whereby the circuit is cleared and the stored signal is simultaneously delivered to the succeeding shifting register element.

4. A shifting register element for a binary digital computer comprising a first Or logical element, a first Not logical element, a first delay means, a second Or logical element, a second Not logical element, and a second delay means connected in tandem, an output terminal of said second delay means being connected to an input terminal of said first Or logical element, a third delay means, an And logical element, an output terminal of said third delay means being connected to an input terminal of said And logical element, a portion of the output signal of said first Or logical element being coupled to said third delay means, and a source of shifting command signals, said source being coupled to another input terminal of said second Or logical element and another input terminal of said And logical element, whereby the circuit is cleared and the stored signal is simultaneously delivered at an output terminal of said And logical element.

5. A shifting register element for a binary digital computer comprising a first Or logical element having at least two input terminals, a first Not logical element, a first delay means, a second Or logical element, a second Not logical element, and a second delay means connected in tandem, an output terminal of said second delay means being connected to an input terminal of said first Or logical element, the other input terminal of said first Or logical element being connected to a source of digital signals to be stored, a third delay means, an And logical element, an output terminal of said third delay means being connected to an input terminal of said And logical element, a portion of the output signal of said first Or logical element being coupled to said third delay means, and a source of shifting command signals, said source being coupled to another input terminal of said second Or logical element and another input terminal of said And logical element, whereby the circuit is cleared and the stored signal is simultaneously delivered at an output terminal of said And logical element.

6. A shifting register circuit element for a binary digital computer comprising first, second, and third functors, an output terminal of said first functor being connected to an input terminal of said second functor and an output terminal of said second functor being connected to an input terminal of said first functor, another output terminal of said first functor being connected to an input terminal of said third functor, a temporally controllable source of signals representing one, said source being coupled to said one input terminal of said second functor and to another input terminal of said third functor, whereby the signals of said source may be delivered to the circuit simultaneously with the delivery of output signals by said first functor.

7. A shifting register element for a binary digital computer comprising a first Not logical element, a first delay means, a second Not logical element, and a second delay means connected in tandem, a source of digital signals to be stored in the register element, an output terminal of said second delay means and said digital source being connected in parallel to an input terminal of said first Not logical element, a third delay means and an And logical element connected in tandem, a portion of the output signal of said second delay means being connected to said third delay means, and a source of shifting command signals, said command source being connected in parallel with said first delay means to said second Not logical element, and said command source being connected to said And logical element, whereby the circuit is cleared and the stored signal is simultaneously delivered at an output terminal of said And logical element.

References Cited in the file of this patent

UNITED STATES PATENTS

| | | |
|---|---|---|
| Re. 23,807 | Williams | Mar. 23, 1954 |
| 2,680,819 | Booth | June 8, 1954 |
| 2,723,354 | Isborn | Nov. 8, 1955 |
| 2,741,758 | Cray | Apr. 10, 1956 |
| 2,769,925 | Saunders | Nov. 6, 1956 |

OTHER REFERENCES

An Electronic Digital Computer (Booth), Electronics Engineering, December 1950, pp. 492–498; see page 495. Copy 250–27CC, Div. 51.